Sept. 21, 1954

R. G. WILSON 2,689,935

CONSTANT SPEED CONTROL FOR ELECTRIC MOTORS

Filed March 22, 1951

Time   Large Load

Time   Average Load

Time   No Load

INVENTOR.
Robert G. Wilson

BY

ATTORNEY

Patented Sept. 21, 1954

2,689,935

UNITED STATES PATENT OFFICE 2,689,935

CONSTANT SPEED CONTROL FOR ELECTRIC MOTORS

Robert G. Wilson, Tallmadge, Ohio, assignor to Goodyear Aircraft Corporation, Akron, Ohio, a corporation of Delaware Application March 22, 1951, Serial No. 216,928

5 Claims. (Cl. 318—322)

This invention relates to an apparatus for maintaining the R. P. M. of an electric motor constant over a wide range of loading, and, more particularly, to an apparatus which synchronizes the speed of the motor with the natural frequency of a vibrating reed or the like.

While a number of systems have been proposed by the prior art for utilizing the constant frequency of a vibrating reed or the like to control the speed of an electric motor, such systems have either proved complicated and costly or have been capable of functioning over very limited changes in voltage or loading of the electric motor. Such systems have utilized the vibrating reed for controlling the speed of the motor in various ways, none of which, to the inventor's knowledge, combines the simplicity and accuracy of control of the present invention.

It is the general object of this invention to provide an improved, inexpensive, sensitive, accurate, and simplified apparatus for automatically maintaining the speed of a motor from either an A. C. or D. C. current source at a constant value.

Another object of this invention is to provide and maintain the speed of an electrical motor at a value determined by the natural frequency of a vibrating reed or similar element.

Another object of this invention is the provision of an apparatus for maintaining the speed of an electrical motor substantially constant regardless of changes in load.

Another object of this invention is to provide a speed control apparatus for an electric motor which is insensitive to input voltage changes over a substantial range.

These and other objects of the invention, which will become apparent as the description proceeds, are achieved by the provision of an apparatus including in combination an electric motor having a pair of commutators associated therewith. The commutators are provided with an equal number of insulated segments and single collector contacts, the motor being electrically connected across the contacts of the commutators. Energized from a source of current is a vibrator, the oscillations of which are sustained by energy derived from the electrical current source. Associated with the vibrating reed is a pair of single-throw, single-pole switches alternately closed by the vibrator and in synchronism therewith. The current source is connected to alternate segments of one commutator and through one of the single-pole, single-throw switches to the remaining segments of the one commutator. Likewise, the current return is connected to alternate segments of the other commutator and through the other single-pole, single-throw switch to the remaining segments of the other commutator.

For a better understanding of the invention, reference should be had to the accompanying drawings, wherein.

Figure 1:
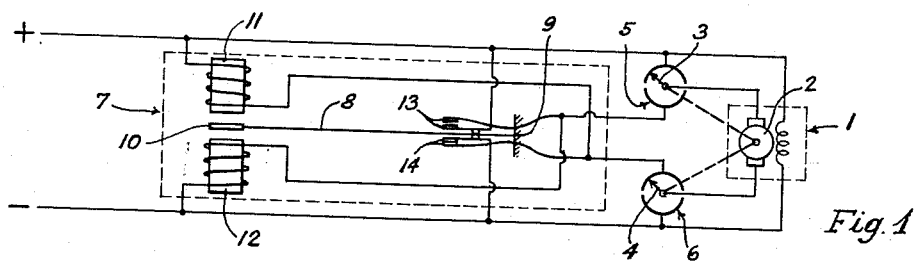
Fig. 1 is a diagrammatic view of one embodiment of the invention using two commutators.

With specific reference to the form of the invention illustrated in Fig. 1, the numeral 1 indicates generally an electric motor. While a shunt type motor, the field of which is excited from a D. C. voltage source, is preferably employed and is so illustrated, it is to be understood that a series type universal motor can be used.

The armature 2 of the motor 1 is connected across a pair of contacts 3 and 4, rotated by the motor. These contacts are associated with the commutators 5 and 6 respectively. While the commutators 5 and 6 are illustrated as having two segments each, it will be appreciated that any multiple of 2 can be employed, depending on the desired speed of the motor 1. This will become more evident as the description proceeds.

The reference frequency for regulating the R. P. M. of the motor is derived from the vibrator unit indicated generally at 7, which is preferably of the type commonly employed in the well known vibrator unit of an automobile radio. The vibrator unit 7 includes a vibrating reed 8 having a cantilever support 9 at one end and having a weight 10 at the other end. The weight 10 is of magnetic material and is attracted alternately to the electro-magnets 11 and 12, which sustain oscillation of the reed 8 at its natural frequency, as hereinafter described.

Associated with the vibrating reed 8 is a pair of single-pole, single-throw switches 13 and 14. The switches 13 and 14 are so arranged that they are alternately closed during each half cycle of the vibrating reed 8. One side of the switches 13 and 14 is connected to the positive and negative terminal of the D. C. voltage supply (not shown) respectively. The other contacts of the switches 13 and 14 are connected through the coils of the electro-magnets 12 and 11 respectively to the D. C. voltage supply. Thus, when the switch 13 is closed, the circuit is completed through the electro-magnet 12, and similarly, when the switch 14 is closed, the circuit is completed through the electro-magnet 11. Thus, the vibrating reed by means of switches 13 and 14 energizes the electro-magnets 11 and 12 so as to sustain oscillation of the vibrating reed 8.

The commutator 5 is associated with one side of the line from the D. C. voltage supply, while the commutator 6 is associated with the other side of the line from the D. C. voltage supply. Alternate segments of the commutators are connected directly to the line and through the reed-actuated switches 13 and 14 to the line. Commutators 5 and 6 are so phased that when the contact 3 is connected directly to the one side of the line through the commutator 5, the contact 4 is connected to the other side of the line only when the series switch 14 is closed, and vice versa, when the contact 3 is connected to the line through the switch 13, the contact 4 is connected directly to the other side of the line as shown.

The speed of the motor under varying load is controlled by the average current flowing through the armature 2. The average current in turn is controlled by interrupting the flow of current from the D. C. voltage supply during a portion of each half revolution of armature 2, as determined by the phase relationship between the commutator and the vibrating reed. With two segments in the commutators, as illustrated, the armature 2 makes one complete revolution for each complete cycle of the vibrating reed 8. During any half cycle of the vibrating reed 10, for example, either the switch 13 or 14 will be closed. Assuming for the moment that the switch 14 is closed, with the commutator in the position illustrated in Fig. 1, at the time the switch 14 closes, current flows from the line through the commutator 5 hence through the armature 2 to the commutator 6, switch 14, and back to the line. The current continues to flow until the armature advances the commutators to a point where the contacts 3 and 4 come into position to contact the opposing segments of the commutators 5 and 6. Subsequently, the switch 14 opens and the switch 13 closes and current again flows through the armature 2 until interrupted by the contacts 3 and 4 again changing segments in the commutators 5 and 6.

Figure 4:
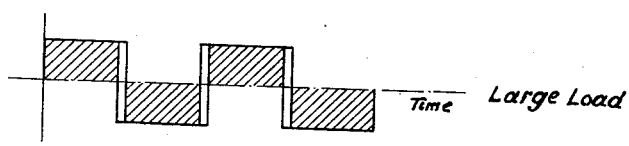
Figures 4 to 6 are graphical representations of the phase relationship between the vibrating reed and commutator for different loads on the motor.
Figure 5:
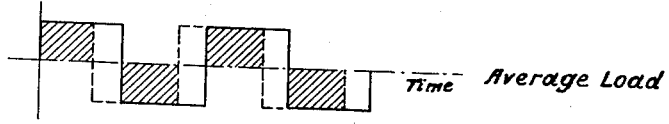
Figure 6:
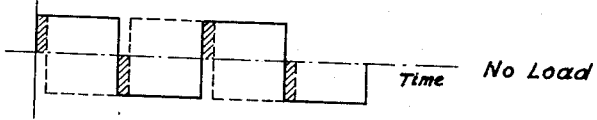

Thus it is evident that if the motor 1 is not loaded and starts to run too fast, it advances the phase of the commutator with respect to the vibrator so that current flows only during a small portion of each revolution. Since the current can be reduced to zero in this way, the motor eventually finds a phase angle so as to supply adequate power to run at the proper speed. Fig. 6 illustrates graphically the phase relationship and current flow at no-load. The solid line represents the time the vibrator-operated switches are open and closed; the dotted line, the time the commutator segments are contacted. Current flows only during the time the switches and corresponding commutator segments are simultaneously closed, or, as indicated graphically, when the solid and dotted line overlap. If a load is applied, the phase of the motor approaches that of the vibrator, current flows for a greater portion of the cycle, and the motor therefore continues to run at the same speed. Obviously, there is a limit to the load which can be placed on the motor without causing the motor to drop out of synchronism with the vibrating reed. Thus, when the load is such that 100 percent current at the synchronous speed is reached, the motor will drop out of synchronism and run erratically. Fig. 4 and Fig. 5 illustrate the phase condition for different loads.

Figure 2:
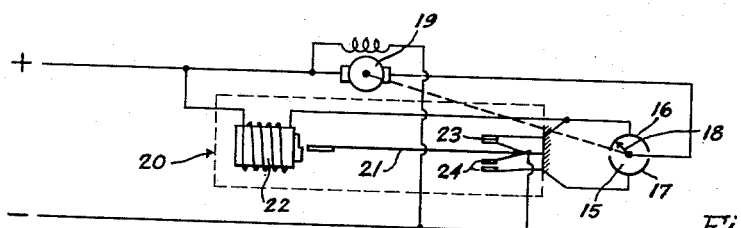
Fig. 2 is a diagrammatic view of a modified form of the invention using a single commutator.

Fig. 2 shows a modified form of the invention in which a single commutator 15, having two opposed segments 16 and 17 and a contact 18, is rotated by the motor, the armature of which is indicated at 19. A vibrator unit, indicated generally at 20, includes a vibrating reed 21 and a single electro-magnet 22. Associated with the vibrating reed 21 is a pair of contacts 23 and 24. When the contact 23 is closed, a circuit is completed through the electro-magnet 22. The reed 21 is sustained in oscillation by the interrupted current through the electro-magnet 22 effected by the contact 23.

Contacts 23 and 24 alternately connect up the segments 16 and 17 of the commutator 15 respectively as the reed vibrates.

Operation of the circuit in controlling the speed of rotation of the armature 19 is similar to the operation of the form of the invention illustrated in Fig. 1 as above described. Thus, as the reed 21 vibrates at its natural frequency, the contacts 23 and 24 are alternately closed. Current flows through the armature 19 depending on the phase relationship of the commutator. Thus during one half cycle of the vibrating reed 21, the contact 23, for example, is closed and if the rotary contactor 18 is in contact with the segment 17 of the commutator 15, current flows through the armature 19. The current is interrupted by the rotation of the commutator 15 and the consequent shift of the contactor 18 from the segment 17 to the segment 16. Current again flows through the armature 19 when the vibrating reed moves into position to close the contact 24. As load is applied to the armature 19 tending to slow it down, current will flow for a greater portion of the time the contacts 23 or 24 are closed, keeping the speed of rotation of the armature 19 substantially constant.

Figure 3:
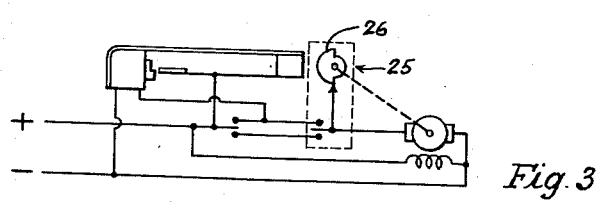
Fig. 3 is a diagrammatic view of a further modification in which a cam-operated switch is used in place of the commutator.

A further modification is indicated in Fig. 3, in which a cam-operated switch 25 is substituted for the commutator 15 in the circuit of Fig. 2. The cam switch is a double-throw, single-pole type which is reversed by each half revolution of the cam 26.

By utilizing a commutator having 4, 6, or 8 segments, the motor can be made to operate at a speed which is a corresponding fraction of the synchronous frequency of the vibrating reed. Thus, for example, if the vibrating reed has a natural frequency of 60 cycles per second, the speed of the motor with a two-segment commutator is 3600 R. P. M.; with a four-segment commutator, 1800 R. P. M.; with a six-segment commutator, 1200 R. P. M., etc. The motor stabilizes at a speed which advances the commutator two segments in the time of one cycle of the vibrating reed.

From the above description, it will be evident that the objects of the invention have been achieved by the provision of a motor control circuit which stabilizes the speed of a motor under varying load and varying voltage conditions by synchronizing the speed of the motor with the natural frequency of a vibrating reed or the like.

While certain representative embodiments and details have been shown for the purpose of illustrating the invention, it will be apparent to those skilled in this art that various changes and modifications may be made therein without departing from the spirit or scope of the invention.

What is claimed is:

1. In combination a shunt motor, a pair of commutators rotated by the motor, said commutators having an equal and even number of segments, a tuned vibrator, said vibrator being energized to sustain oscillation, a pair of single-pole, single-throw switches alternately closed by the vibrator, and a D. C. power source connected to the field of the motor, one side of said voltage source being also connected to alternate segments of one of the commutators and through one of the switches to the remaining segments of said one commutator, the other side of said voltage source being also connected to alternate segments of the other commutator and through the other switch to the remaining segments of said other commutator, the armature of said motor being connected across the output of the two commutators.

2. In combination a motor, a pair of commutators rotated by the motor, said commutators each having two segments, a tuned vibrator, said vibrator being energized to sustain oscillation, a pair of single-pole, single-throw switches alternately closed by the vibrator, and an electrical power source, one side of said power source being connected to one segment of one of the commutators and through one of the switches to the remaining segment of said one commutator, the other side of said voltage source being connected to one segment of the other commutator and through the other switch to the remaining segment of said other commutator, said motor being connected across the output of the two commutators.

3. In combination a vibrating reed, magnetic means associated with the reed for sustaining oscillation thereof, a pair of switches actuated by said vibrating reed, said switches being alternately closed during successive half-cycles of the reed, a source of electrical power, a motor, a pair of commutators rotated by said motor, said commutators electrically connecting said motor to the power source alternately through the reed actuated switches.

4. In combination a vibrator, a pair of switches actuated by said vibrator, said switches being alternately closed during successive half-cycles of the vibrator, a source of electrical power, a motor, a pair of commutators rotated by said motor, said commutators electrically connecting said motor to the power source alternately through the vibrator actuated switches.

5. In combination oscillating means, a pair of switches actuated by said oscillating means, said switches being alternately closed during successive half-cycles of the oscillating means, a source of electrical power, a motor, a pair of commutators rotated by said motor, said commutators electrically connecting said motor to the power source alternately through the switches.

References Cited in the file of this patent

UNITED STATES PATENTS

| Number | Name | Date |
|---|---|---|
| 870,505 | Gerrish | Nov. 5, 1907 |
| 1,781,762 | Murphy | Nov. 18, 1930 |
| 1,829,420 | Ranger | Oct. 27, 1931 |
| 1,834,267 | Bonn | Dec. 1, 1931 |
| 1,940,876 | Nycum | Dec. 26, 1933 |
| 2,138,912 | Foss | Dec. 6, 1938 |
| 2,530,749 | Yardney | Nov. 21, 1950 |
| 2,546,783 | Roemke | Mar. 27, 1951 |

FOREIGN PATENTS

| Number | Country | Date |
|---|---|---|
| 316,953 | Great Britain | Oct. 9, 1930 |
| 411,378 | Germany | Mar. 20, 1925 |